Figure 1:
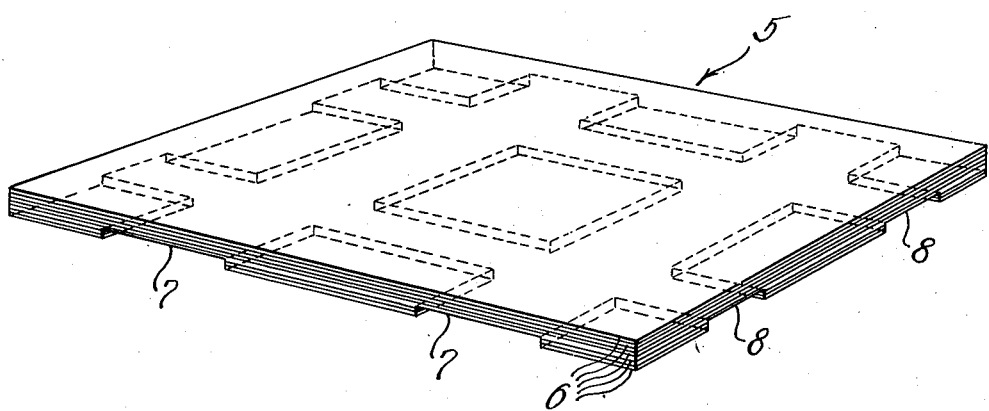

March 20, 1945.   R. H. BRAUN   2,372,055
PALLET
Filed Feb. 14, 1944

INVENTOR.
Robert H. Braun
BY Walter E. Schirmer
Atty.

Patented Mar. 20, 1945

2,372,055

UNITED STATES PATENT OFFICE 2,372,055

PALLET

Robert H. Braun, Glendale, Calif.

Application February 14, 1944, Serial No. 522,341

4 Claims. (Cl. 248—120)

This invention relates to pallets, and more particularly is concerned with a pallet construction for use in connection with material handling devices such as industrial fork trucks and the like.

It has been the practice heretofore in providing a pallet construction to produce a pallet having upper and lower surfaces spaced apart by spacer members defining openings into which the forks of an industrial truck load lifting mechanism can be inserted for lifting the pallet from the ground or other supporting surface.

Such constructions have been relatively expensive, the constructions occupying considerable space due to their height which usually runs from four to six inches. When tiering a number of pallet loads, one on top of the other, this reduces the effective load space considerably.

Another disadvantage of such constructions is that where material is shipped by pallet and the pallets are then returned, pallets of the double faced construction require a considerable amount of shipping space when returned empty.

It is the object of the present invention to provide a sturdy pallet construction of relatively small thickness which will amply support the material to be handled thereon and which will accommodate reception of the fork ends of lift fingers but will occupy very little space when tiered in a storage warehouse or the like, and will also occupy considerably less space when a number of such pallets are returned empty for reuse.

Another object of the present invention is to provide a pallet construction of laminated type, preferably using successive laminations of plywood arranged so that the grain of the successive sheets of plywood run in normal directions to produce a sturdy single-thickness pallet which will not be subjected to splitting or cracking. The under surface of this pallet construction is grooved out at properly spaced points to provide two transversely extending channels in the under surface of a sufficient depth to receive the forks of an industrial fork truck whereby the pallet can be lifted up bodily with a load thereon, transported to any desired location, and if desired, one pallet with its load can be deposited upon the top of a second pallet and its load to produce a tiered construction in which the pallets themselves occupy only a very small portion of the total height of the stacked goods.

Preferably, the laminations of plywood which constitute the pallet are pressed and glued together by any suitable method well known to those skilled in the art of making plywood, thereby providing a sturdy construction which is not subjected to cracking or splitting.

Other objects and advantages of the present invention will appear more fully from the following detailed description which, taken in conjunction with the accompanying drawing, will disclose to those skilled in the art the particular construction of a preferred form of the present invention.

Figure 2:

In the drawing:

Figure 1 is a perspective view of a pallet construction embodying the present invention; and Figure 2 is an elevational view of the pallet shown in Figure 1.

Referring now in detail to the drawing, the pallet, indicated generally at 5, consists of a number of thicknesses of plywood suitably glued together, each layer of plywood being indicated by the reference numeral 6. The layers of plywood are preferably laid in cross-grained relationship to provide a more sturdy construction, and the pallet as a whole is formed as a substantially square or rectangular element.

Extending transversely through the pallet on the under surface thereof are two channels or grooves 7 which are spaced apart a distance sufficient to receive the spaced, forwardly extending portions of the forks of an industrial truck, and are of sufficient depth to accommodate such forks, the forks usually being approximately an inch in thickness and tapering out toward the chisel end thereof.

While only two such grooves 7 are required in order to manipulate the pallet with the fork truck it is sometimes desirable to provide additional grooves running in an opposite direction in order that the pallet may be picked up from any of four directions to facilitate more rapid handling thereof and not require the truck to approach the pallet from any particular position. Consequently, additional grooves 8 are provided running at right angles to the grooves 7 and are of substantially the same depth. It will be apparent that with this type of construction the forks can be employed to lift the pallet either from the front or rear of each set of grooves 7 and 8.

It will be noted that the grooves 7 extend partially into the third plywood layer counting from the bottom of the pallet. The purpose of this is to prevent the grooves terminating at the contacting surface of the plywood sheets so that there is a reduced tendency toward any possible distortion of these sheets or any separating action being produced thereon. This is indicated generally at 9 which shows that the groove extends partially through the third layer of plywood so that the sides of the forks will not have a tendency to exert a separating effect on the respective layers.

It is to be understood that such pallets can be standardized in dimensions for various capacities of lift trucks, and it is further contemplated that the pallet shall preferably be used with the chisel type of forks; namely, a fork having a uniform taper and being approximately $\tfrac{7}{8}$ of an inch in thickness at the toe and increasing in thickness toward the heel where the forks may be from an inch and a half to two inches in thickness. The depth of the groove 7, of course, can vary within limits, but with a standardized pallet construction as described above the depth of this groove need be only approximately $\tfrac{3}{8}$ of an inch deep, as the toe end of the fork can be inserted therein and the fork then forced through the groove by forward movement of the truck, the pallet being slightly raised by the tapering action of the fork as it progresses from the front to the rear of the groove. The width of the groove is slightly greater than the width of the fork, possibly within the range of one to two inches greater in width than the width of the fork so that extreme accuracy is not required in inserting the forks into the grooves of the pallet.

It is to be understood that the provision of the grooves 8 is optional, as in some circumstances it may not be necessary or desirable to provide both sets of grooves.

I am aware that various changes may be made in certain features of the present invention without in any way departing from the scope and spirit thereof, and I therefore do not intend to be limited except as defined by the appended claims.

I claim:

1. A pallet construction for industrial fork trucks comprising a rectangular member composed of laminated plywood sections, the under surface of said member having a pair of laterally spaced grooves extending laterally thereacross, a second pair of spaced grooves extending across the under surface of said member at right angles to said first pair of grooves, said grooves being of a depth such as to terminate intermediate the surfaces of one of the laminations of said member.

2. A pallet construction for industrial fork trucks comprising a flat rectangular body member having a smooth upper surface for receiving a load, said member being formed of a plurality of flat sections secured together in laminated relation, and a pair of spaced parallel grooves extending transversely across the under surface of said member for receiving the projecting ends of the forks of said truck, said grooves being of a depth not equal to the multiple of the respective lamination thicknesses.

3. A pallet construction for use with industrial fork trucks comprising a flat rectangular member of uniform thickness and formed of laminated plywood having a smooth upper surface, and recesses cut out of the undersurface of said member and forming spaced parallel channels in said undersurface, said member being adapted to rest directly on its undersurface when not carried by the forks of a lift truck.

4. The pallet of claim 3 wherein the undersurface of said pallet has two sets of channels formed therein extending in directions at right angles to each other.

ROBERT H. BRAUN.